United States Patent [19]
Takahashi

[11] Patent Number: 5,739,853
[45] Date of Patent: Apr. 14, 1998

[54] DEVICE FOR SUPPORTING OPTICAL SYSTEM OF TELEVISION CAMERA AND HAVING TWO SPRING SYSTEMS FOR REDUCING RATTLING IN TWO DIFFERENT DIRECTIONS

[75] Inventor: Masami Takahashi, Zushi, Japan

[73] Assignee: Matsushita Electric Industrial Co., Ltd., Osaka, Japan

[21] Appl. No.: 593,111

[22] Filed: Feb. 1, 1996

Related U.S. Application Data

[63] Continuation of Ser. No. 306,413, Sep. 15, 1994, abandoned.

[30] Foreign Application Priority Data

Jan. 13, 1994 [JP] Japan .................................. 6-002212

[51] Int. Cl.[6] .................................................. H04N 5/225
[52] U.S. Cl. .................................... 348/335; 348/374
[58] Field of Search .............................. 348/335, 340, 348/355, 373, 374, 375; 354/195.1

[56] References Cited

U.S. PATENT DOCUMENTS

| 4,769,711 | 9/1988 | Date ............................ 348/374 |
| 5,005,948 | 4/1991 | Takahashi et al. ............ 348/355 X |
| 5,032,919 | 7/1991 | Randmae ..................... 348/374 X |

*Primary Examiner*—Wendy Garber
*Attorney, Agent, or Firm*—Watson Cole Stevens Davis, P.L.L.C.

[57] ABSTRACT

A device for supporting an optical system of a television camera has a pair of positioning holes, formed in a bracket holding an image pickup element, which are fitted respectively on a pair of positioning pins formed on a rear side of an escutcheon holding a lens, thereby positioning the image pickup element in a horizontal and a vertical direction. Rattling of the bracket in a direction perpendicular to the optical axis of the optical system is absorbed by a pair of plate springs, and also rattling of the bracket in a direction of the optical axis is absorbed by a pair of coil springs, thereby enabling a high-precision adjustment.

4 Claims, 4 Drawing Sheets

5,739,853

1

DEVICE FOR SUPPORTING OPTICAL SYSTEM OF TELEVISION CAMERA AND HAVING TWO SPRING SYSTEMS FOR REDUCING RATTLING IN TWO DIFFERENT DIRECTIONS

This application is a continuation of application Ser. No. 08/306,413, filed Sep. 15, 1994 (abandoned).

BACKGROUND OF THE INVENTION

This invention relates to a device for supporting an optical system of a television camera such as a CCTV camera.

FIG. 6 shows a conventional optical system support device of the type described. In FIG. 6, reference numeral 1 denotes a lens seat, reference numeral 2 a FB adjusting ring, reference numeral 3 an escutcheon, reference numeral 4 a bracket, reference numeral 5 an element mounting seat, reference numeral 6 an image pickup element, reference numeral 7 an element holder plate, reference numeral 8 a front chassis, and reference numeral 9 a leaf spring. The image pickup element 6 is attached to the element mounting seat 5, and then the element holder plate 7 is fitted on the image pickup element 6, and is fixedly secured by screws 10A to the element mounting seat 5, with the image pickup element 6 held therebetween. Then, the element mounting seat 5 is secured to a rear surface of the bracket 4 by screws 10B. The two leaf springs 9 for absorbing the rattling of the bracket 4 in an axial direction (forward-backward direction) are secured to a front surface of the bracket 4 by respective screws 10C. Projections 4a, formed on an outer peripheral surface of the bracket 4, are engaged respectively in recesses 1a formed in an outer peripheral portion of the lens seat 1, and then the lens seat 1 is fixedly secured to the front chassis 8 by screws 10D. As a result, the center of the image pickup element 6 coincides with the center of the lens seat 1, that is, an optical axis OA of this optical system, and also the positioning of the image pickup element 6 in a horizontal and a vertical direction is achieved. Then, the FB adjusting ring 2 for adjusting the flange-back is passed through an opening 3a in the escutcheon 3, and a threaded portion 2a on an inner periphery of the FB adjusting ring 2 is threaded on a threaded portion 1b on an outer periphery of the lens seat 1. With this arrangement, by rotating the FB adjusting ring 2, the lens seat 1 and the image pickup element 6 are moved back and forth, thereby adjusting the flange-back, that is, the distance between the lens seat 1 and the image pickup position.

In the above conventional optical system support device, however, the projections 4a are fitted respectively in the recesses 1a for positioning the bracket 4 (which holds the image pickup element 6) with respect to the lens seat 1, and therefore a gap inevitably develops between the mating projection 4a and recess 1a partly because of the provision of a draft. This has resulted in a problem that when the FB adjusting ring 2 is rotated, rattling develops in the peripheral (circumferential) direction or a direction perpendicular to the optical axis, so that the image on a picture screen moves during the adjustment of the flange-back. Moreover, because of this rattling, much time and labor are required for the optical adjustment, which has invited a problem that a high-precision adjustment can not be carried out easily. Particularly recently, the image pickup size has become smaller, and even a slight degree of rattling is amplified on the picture screen. To deal with this, if the precision of processing (machining) of the component parts is improved so as to enhance the optical precision, this has resulted in a problem that the cost is increased.

2

SUMMARY OF THE INVENTION

With the above problems of the prior art in view, it is an object of this invention to provide a device for supporting an optical system of a television camera, in which the rattling of a bracket holding an image pickup element is eliminated, thereby enabling a high-precision adjustment.

According to the present invention, there is provided a device for supporting an optical system of a television camera, comprising:

an escutcheon having at its rear side a first positioning portion serving as a reference of positioning in a horizontal and a vertical directions, the escutcheon having a lens holding portion;

a flange-back adjusting ring rotatably mounted on a front side of the escutcheon;

a bracket mounted on the rear side of the escutcheon, the bracket holding an image pickup element, and having a second positioning portion fitted relative to the first positioning portion of the escutcheon;

first spring means for absorbing rattling of the bracket in a direction perpendicular to an optical axis of the optical system; and second spring means for absorbing rattling of the bracket in a direction of the optical axis thereof.

With this construction of the present invention, by fitting the second positioning portion of the bracket relative to the first positioning portion of the escutcheon, the positioning of the image pickup element in the horizontal and vertical directions is effected, and also the rattling of the bracket in the peripheral and axial directions are absorbed by the first and second spring means, and therefore the adjustment can be carried out with high precision.

DESCRIPTION OF THE PREFERRED EMBODIMENT

Figure 1:
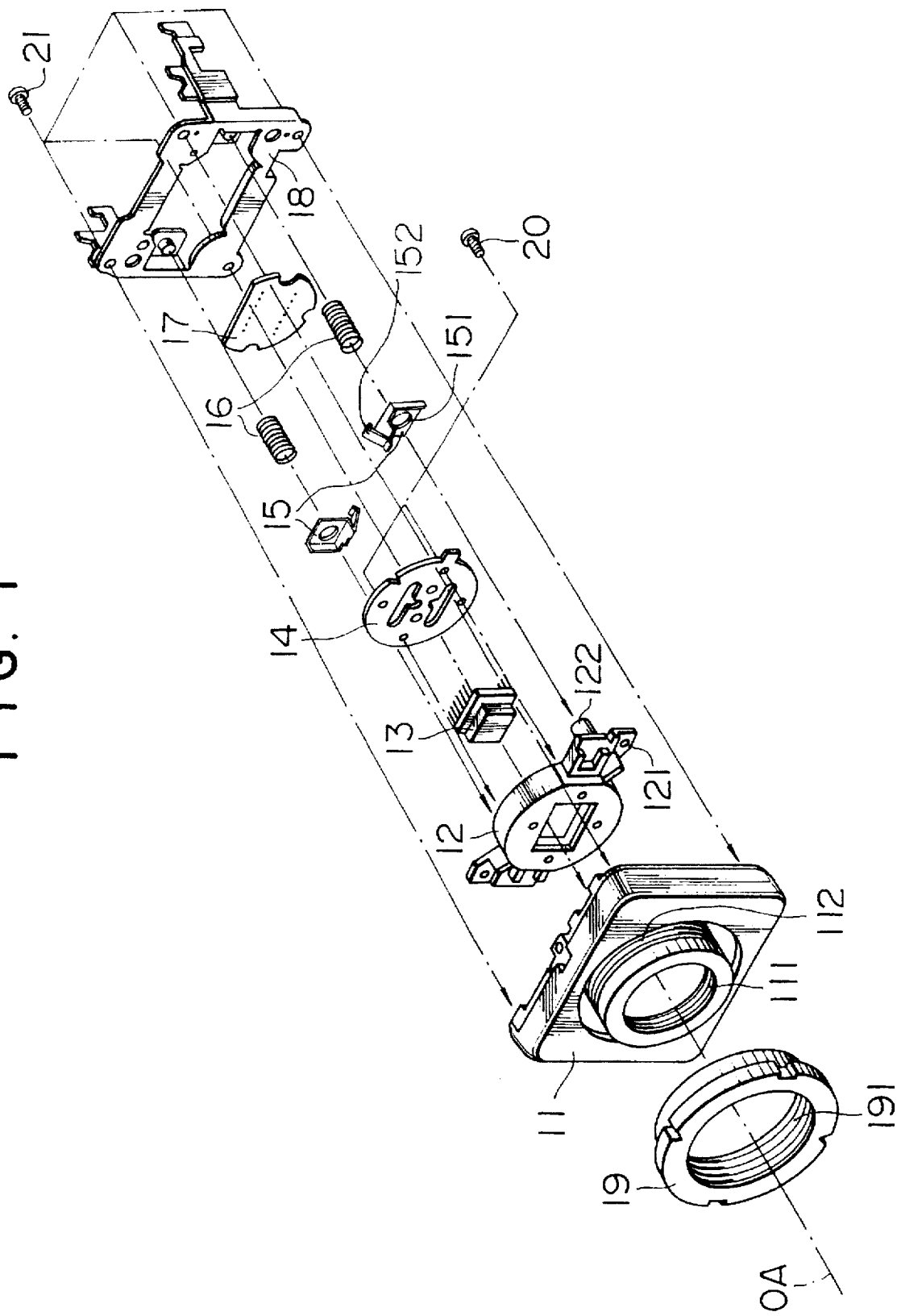
FIG. 1 is an exploded, perspective view of one preferred embodiment of an optical system support device of the present invention.
Figure 2:
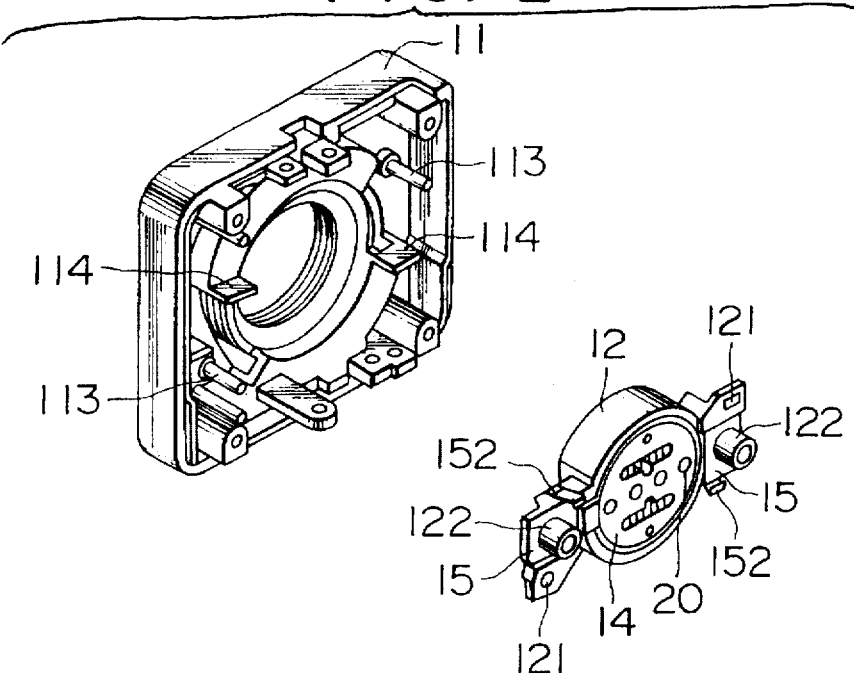
FIG. 2 is a perspective view showing an important portion of the support device during an assembling operation.
Figure 3:
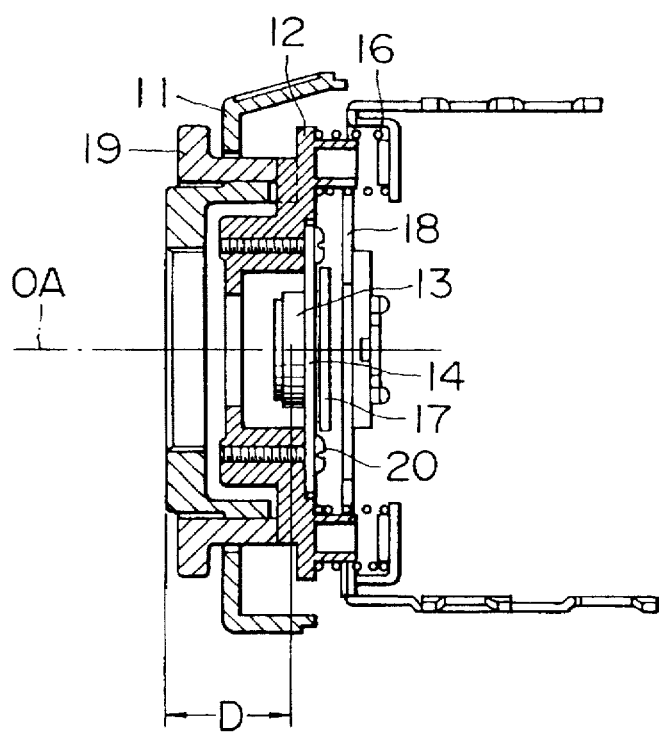
FIG. 3 is a horizontal cross-sectional view through a central portion of the support device in an assembled condition.
Figure 4:
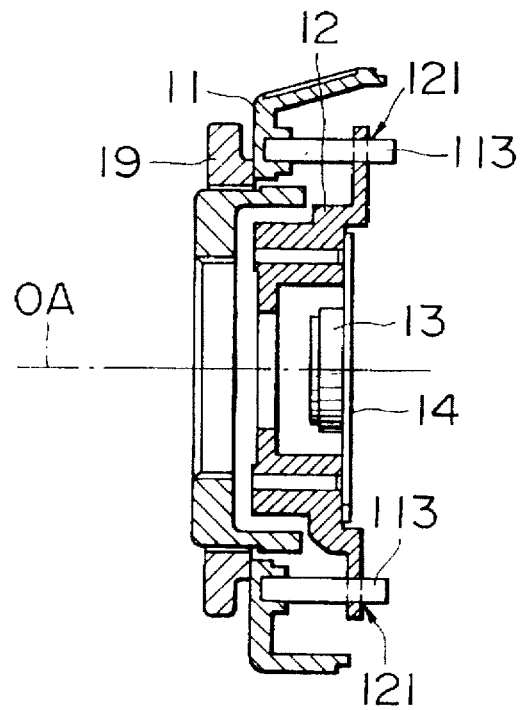
FIG. 4 is a horizontal cross-sectional view in a plane near positioning pins in the assembled condition of the support device.
Figure 5:
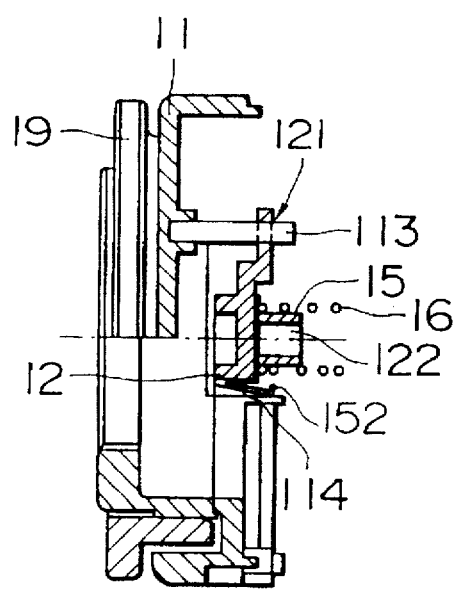
FIG. 5 is a vertical cross-sectional view in a plane through a leaf spring in the assembled condition of the support device.
Figure 6:
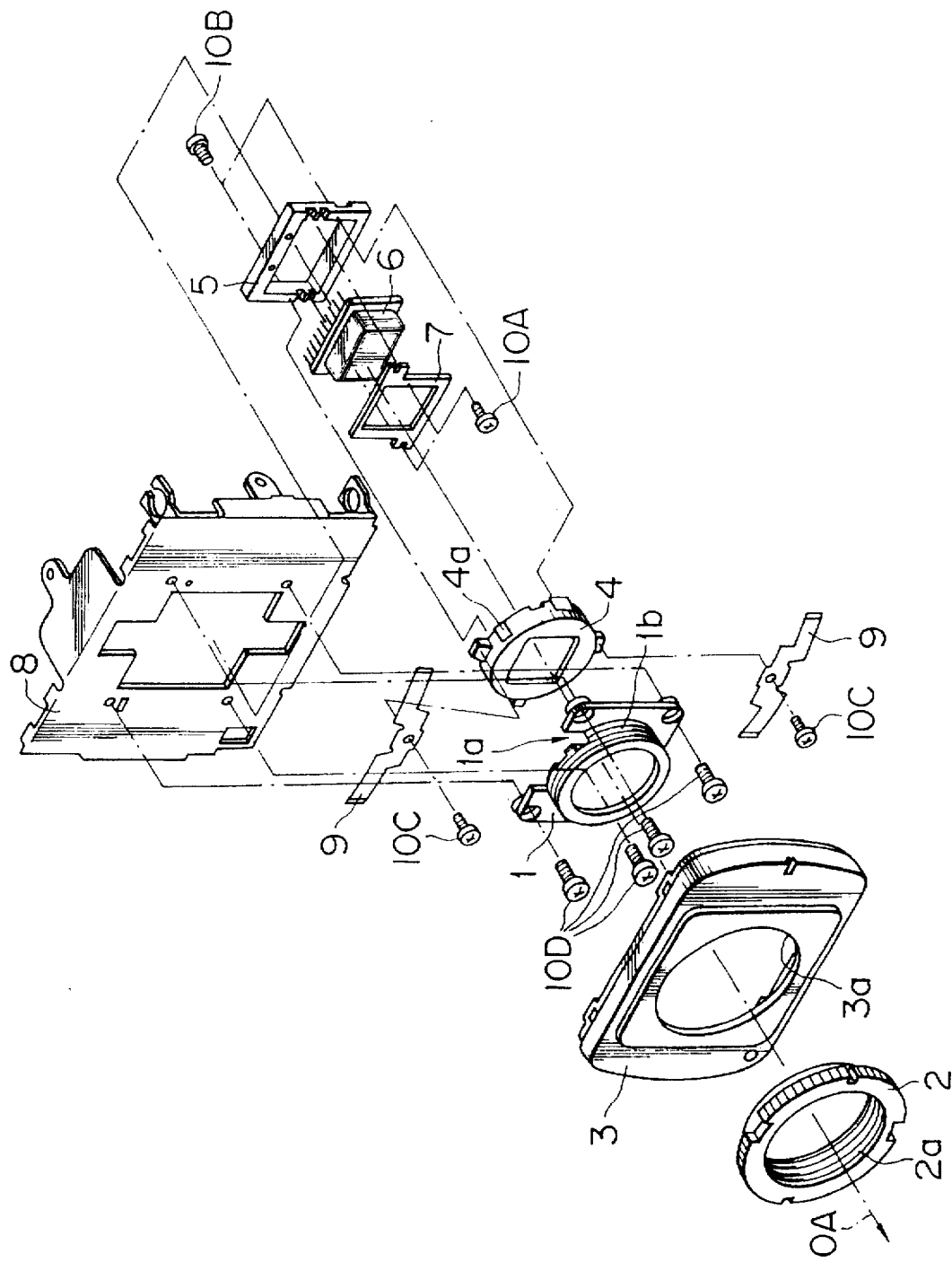
FIG. 6 is an exploded, perspective view of one example of conventional optical system support device.

One preferred embodiment of the present invention will now be described with reference to the drawings. In FIG. 1, reference numeral 11 denotes an escutcheon, reference numeral 12 a bracket, reference numeral 13 an image pickup element, reference numeral 14 an element mounting seat, reference numeral 15 a plate spring, reference numeral 16 a coil spring, reference numeral 17 an element-mounting circuit board, reference numeral 18 a mounting angle, reference numeral 19 an FB adjusting ring, and reference numerals 20 and 21 screws. The escutcheon 11 has a tubular portion formed at its central portion, and a threaded portion 111 for holding a lens is formed on an inner peripheral surface of this tubular portion. A threaded portion 112 for threaded connection to a threaded portion 191 formed on an inner peripheral surface of the FB adjusting ring 19 is formed on an outer peripheral surface of the tubular portion of the escutcheon 11. As shown in FIG. 2, two positioning pins 113, serving as a reference or basis of positioning in a horizontal and a vertical direction, are formed on and projected from the rear side or face of the escutcheon 11, and two stopper walls 114 for imparting reaction forces respectively to the plate springs 15 are also formed on the rear side of the escutcheon 11. The bracket 12 has an opening of a rectangular shape formed through a central portion thereof, the image pickup element 13 being inserted into this opening. A pair of tabs are formed respectively on opposite lateral sides of the bracket 12, and a positioning hole 121 for passing a respective one of the positioning pins 113 therethrough is formed through each of these tabs, and a mounting boss 122 is formed on each of the tabs adjacent to the positioning hole 121.

An assembling sequence for this embodiment will now be described. In FIG. 1, the image pickup element 13 is first secured in position to a front face of the element mounting seat 14 by an adhesive or the like, and then the element mounting seat 14 is fastened to the bracket 12 by the screws 20. This fastening operation is effected using the positioning holes 121 of the bracket 12 as a reference, and an optical axis OA and an inclination thereof are properly adjusted. Then, mounting holes 151 in the plate springs 15 are fitted respectively on the mounting bosses 122 on the rear face of the bracket 12, and then the bracket 12 is attached to the escutcheon 11. This attaching operation is effected by fitting the positioning holes 121 of the bracket 12 respectively on the positioning pins 113 of the escutcheon 11. As a result, the center of the lens-mounting threaded portion 111 of the escutcheon 11, that is, the optical axis OA, coincides with the center of the image pickup element 13, and also a projection 152 of each of the plate springs 15 is pressed against the associated stopper wall 114 of the escutcheon 11 to urge the bracket 12 in one peripheral (circumferential) direction with respect to the escutcheon 11 by its reaction force, thereby absorbing the rattling of the bracket 12 in the peripheral direction. Then, the coil springs 16 are inserted respectively into the mounting bosses 122 of the bracket 12, and then the mounting angle 18 is fixedly secured to the escutcheon 11 by the screws 21. As a result, the bracket 12 is pressed against the escutcheon 11 by the coil springs 16, so that the rattling of the bracket 12 in the axial direction (forward-backward direction) is absorbed. Then, pins on the image pickup element 13 are fitted respectively in holes in the element-mounting circuit board 17, and the FB adjusting ring 19 is attached to the escutcheon 11 by threading its threaded portion 191 on the threaded portion 112 of the escutcheon 11.

As described above, in this embodiment, by rotating the FB adjusting ring 19, the escutcheon 11 can be moved back and forth together with the bracket 12 and the image pickup element 13 without rattling, thereby adjusting the flange-back distance D highly precisely. Since no backlash or play is present between the escutcheon 11 and the bracket 12, the optical axis OA and the inclination thereof can be adjusted with high precision. Moreover, since the associated parts can be attached to the escutcheon 11 from one direction, the time and labor required for the assembling operation can be reduced.

In the above embodiment, although the positioning pins 113 are formed on the escutcheon 11 while the positioning holes 121 are formed in the bracket 12, such positioning holes may be formed in the escutcheon 11 while such positioning pins may be formed on the bracket. Instead of such pin-hole engagement, the engagement between convex and concave portions of any other suitable shape may be used.

In the present invention, as is clear from the above embodiment, the optical axis of the television camera, the inclination thereof and the flange-back can be adjusted with high precision, and therefore the movement of the image on the picture screen during the flange-back adjustment as previously experienced can be eliminated. The flange-back adjustment can be carried out easily. There have now been increasingly used television cameras of the type in which a focus adjusting mechanism is not provided on a lens, and instead the focus adjustment is effected at the camera side. In this type of television camera, the adjustment when setting the camera is quite easily effected as a result of eliminating the movement of the image on the picture screen. Furthermore, the optical precision can be enhanced without improving the precision of processing (machining) of the component parts, and therefore the reduction of the image pickup size can be satisfactorily dealt with without increasing the cost.

What is claimed is:

1. A device for supporting an optical system of a television camera, comprising:

an escutcheon having at a first side a first positioning portion serving as a positioning reference in first and second mutually orthogonal directions which are orthogonal to an optical axis of said optical system, said escutcheon having a lens holding portion;

a flange-back adjusting ring rotatably mounted on a second side of said escutcheon, said second side being opposite to said first side;

an image pickup element;

a bracket mounted on said first side of said escutcheon, said bracket holding said image pickup element and having a second positioning portion positioned to cooperate with said first positioning portion of said escutcheon to position said image pickup element relative to said escutcheon in said first and second directions;

first spring means comprising at least one plate spring for urging said bracket in one circumferential direction relative to said escutcheon, said circumferential direction being defined with respect to said optical axis of the optical system, to absorb rattling motion of said bracket in said circumferential direction; and second spring means for absorbing rattling motion of said bracket in a direction of said optical axis thereof.

2. A device according to claim 1, in which said first positioning portion comprises a pair of pins extending from the first side of said escutcheon, and said second positioning portion is constituted by a pair of holes formed in said bracket, said pair of pins being fitted in said pair of holes, respectively.

3. A device according to claim 1, in which said first spring means comprises a pair of plate springs mounted on said bracket, and said escutcheon has a pair of stopper walls formed on the first side thereof, said pair of plate springs being pressed respectively against said pair of stopper walls to urge said bracket in said circumferential direction of said bracket with respect to said optical axis of the optical system.

4. A device according to claim 1, in which said second spring means comprises at least one coil spring urging said bracket against the first side of said escutcheon.

* * * * *